(12) United States Patent
Frank (10) Patent No.: US 8,892,922 B2
(45) Date of Patent: Nov. 18, 2014

(54) VOLTAGE DETECTION

(75) Inventor: Michael Frank, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 753 days.

(21) Appl. No.: 12/957,369

(22) Filed: Nov. 30, 2010

(65) Prior Publication Data

US 2012/0133352 A1    May 31, 2012

(51) Int. Cl.
  *G06F 1/32*    (2006.01)
(52) U.S. Cl.
  CPC .......... *G06F 1/3296* (2013.01); *Y02B 60/1217* (2013.01); *G06F 1/324* (2013.01); *Y02B 60/1285* (2013.01)
  USPC ............ 713/322; 713/310; 713/340; 323/318
(58) Field of Classification Search
  USPC ............................. 713/310, 322, 340; 323/318
  See application file for complete search history.

(56) References Cited

U.S. PATENT DOCUMENTS

| | | | |
|---|---|---|---|
| 6,874,083 B2 * | 3/2005 | Sarangi et al. | 713/100 |
| 7,126,433 B2 | 10/2006 | Godambe et al. | |
| 7,194,647 B2 * | 3/2007 | Flynn | 713/322 |
| 7,257,723 B2 * | 8/2007 | Galles | 713/321 |
| 7,437,586 B2 * | 10/2008 | Cornelius | 713/340 |
| 7,652,494 B2 | 1/2010 | Dobberpuhl et al. | |
| 7,701,224 B2 * | 4/2010 | Tsunekazu et al. | 324/543 |
| 8,067,861 B2 * | 11/2011 | Toyama et al. | 307/151 |
| 8,255,730 B2 * | 8/2012 | Tatsumi | 713/340 |
| 2007/0120583 A1 | 5/2007 | Lam et al. | |
| 2009/0049314 A1 * | 2/2009 | Taha et al. | 713/300 |
| 2009/0158071 A1 | 6/2009 | Ooi et al. | |

FOREIGN PATENT DOCUMENTS

CN    101136500 A    3/2008

* cited by examiner

*Primary Examiner* — Thuan Du
(74) *Attorney, Agent, or Firm* — Meyertons, Hood, Kivlin, Kowert & Goetzel, P.C.

(57) ABSTRACT

Techniques are disclosed relating to detecting a voltage change. In one embodiment, an integrated circuit may include a monitor circuit and a power management unit. The power management unit may be configured to request a voltage change. The monitor circuit may be configured to detect the requested voltage change and to provide an indication that the voltage change is complete. In response to the indication that the voltage change is complete, the power management unit may adjust a clock frequency.

24 Claims, 6 Drawing Sheets

FIG. 7

# VOLTAGE DETECTION

BACKGROUND

1. Technical Field

This disclosure relates generally to circuits, and, more specifically, to monitoring voltage in circuits.

2. Description of the Related Art

In various computing architectures, power management techniques may be used that allow for different voltage and frequency combinations for tasks of varying complexity. For less demanding tasks, the voltage may be decreased to conserve power, increase stability, and lower temperature. Likewise, the frequency may be decreased for similar purposes. For more resource-intensive tasks, the voltage and frequency may be increased for greater performance at the cost of higher temperatures, increased power consumption and decreased stability.

A typical power management sequence includes software performing a voltage change followed by a frequency change. When the software performing such a change is open-loop and thus relies, for example, on an assumed timing delay to complete the voltage change, the frequency change may not be performed correctly. Accordingly, an unstable chip, processor, or system may result.

SUMMARY

This disclosure describes techniques and structures that facilitate monitoring a voltage. In one embodiment, a circuit is disclosed that is configured to monitor a requested voltage change (e.g., to determine whether the requested change is complete). In one embodiment, an apparatus is disclosed that is configured to transmit a request to change a voltage (e.g., of a processor); the apparatus further includes a monitor circuit configured to determine whether the requested change is complete. In one embodiment, in which the request specifies a change to a requested voltage level, the monitor circuit is configured to determine that the requested voltage level has been generated (e.g., by a voltage-controlled oscillator (VCO)) and has been stable for some specified amount of time. Various other attributes of the generated voltage may be monitored as well. In certain embodiments, the monitor circuit may cause a voltage change request to be aborted based on the results of the monitoring. In one embodiment, the apparatus is configured to change a frequency of a clock in response to determining the requested voltage change is complete.

In one (non-limiting) embodiment, a power management unit and a monitor circuit are located on a common integrated circuit. The power management unit is configured to transmit a voltage change request to an off-chip power supply unit. The monitor circuit is configured to detect the state of the voltage change. In one embodiment, the monitor circuit may determine whether a voltage change has occurred by monitoring the frequency of a VCO within the monitor circuit that is coupled to the voltage source being changed. When the voltage change is complete, the monitor circuit may provide an indication to the power management unit that the transition is complete. Upon receiving the transition complete signal, the power management unit may adjust the clock frequency of a processing core within the integrated circuit. In certain embodiments, the techniques and structures disclosed herein may provide a closed-loop control path that more reliably indicates that frequency transitions are possible.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware— for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

In the following discussion, voltage change monitoring is disclosed that allows for a voltage change to be monitored until the change is complete. The disclosure first describes an exemplary system (an SoC), followed by a description of a monitoring circuit that may be implemented in one embodiment of the SoC.

Overview

Figure 1:
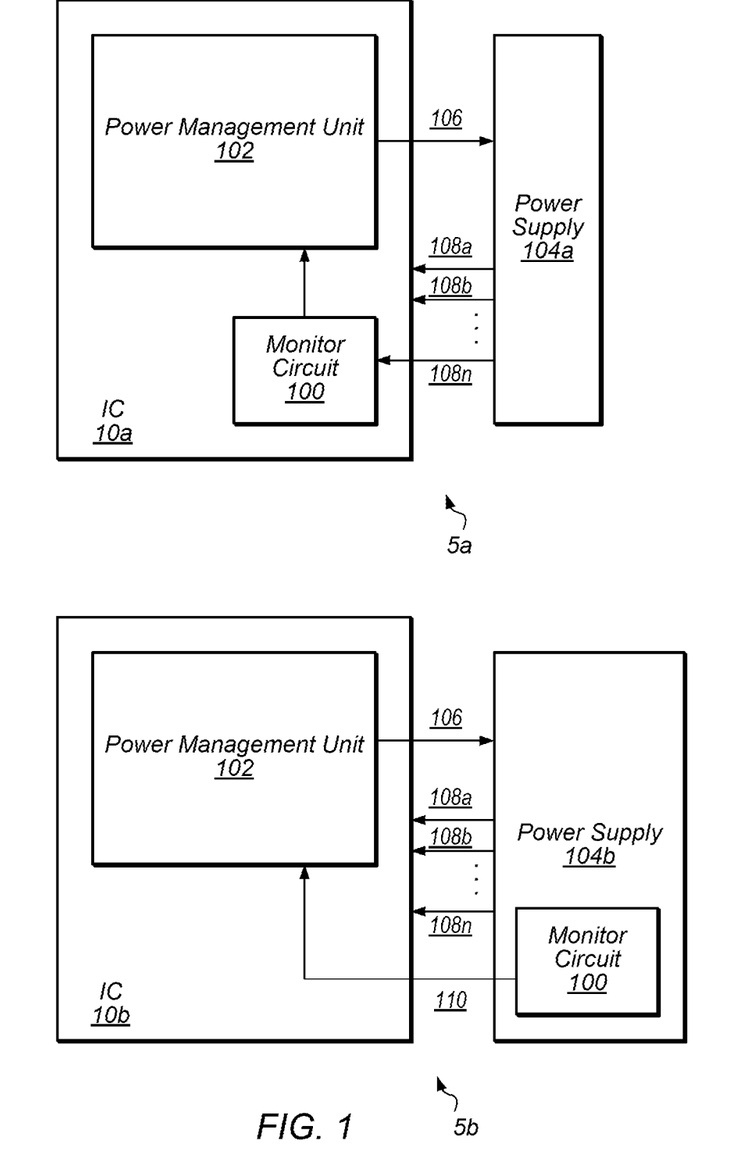
FIG. 1 is a block diagram of one embodiment of an exemplary integrated circuit and power supply.

Turning now to FIG. 1, block diagrams of embodiments of systems 5 are shown. In the first embodiment shown, the system 5a includes an integrated circuit (IC) 10a coupled to an external power supply 104a. In the illustrated embodiment, IC 10a includes monitor circuit 100 and power management unit 102. Power management unit 102 may interface with power supply 104a via command interface 106. Power supply 104a may provide one or more different voltages 108 to IC 10a. In various embodiments, monitor circuit 100 may not be located on IC 10. For example, in the second embodiment shown in FIG. 1, power supply 104b includes monitor circuit 100. Power supply 104b may transmit an indication of the status of a voltage transition to IC 10b via status interface 110.

In one embodiment, power management unit 102 may transmit a request on command interface 106 to power supply 104 to provide a new voltage to IC 10. Upon receiving the request, power supply 104 may supply the requested voltage 108 to IC 10. In one embodiment, power management unit 102 may receive an indication from monitor circuit 100 that the requested voltage change is complete. In one embodiment, system 5 may cause an abort of the voltage change request if the voltage has not been changed to the requested level within a timeout period or threshold. In one embodiment, system 5 may cause an abort of the voltage change request by causing an interrupt to be generated. In different embodiments, different constituent circuits might cause the aborting to occur. In other embodiments, monitor circuit 100 or other components of IC 10 may abort the voltage change request. Upon receiving the indication that the voltage change is complete, power management unit 102 may update the frequency of one or more clocks provided within IC 10. In one embodiment, power management unit 102 may update the frequency of one or more clocks of the central processing unit 14 (shown in FIG. 2). In some embodiments, power management unit 102 may update the frequency of the clocks in a variety of manners, including: releasing a lock on the frequency update, triggering an interrupt request (IRQ), setting a "transition complete" flag in a register, or giving a state machine a state change. In some embodiments, a signal from monitor circuit 100 provides the lock release, IRQ, register flag, or state change. Power management unit 102 may also update a clock frequency incrementally. For example, monitor circuit 100 may signal that the voltage source has been changed to an intermediate voltage level between the starting voltage level and the requested voltage level, within a time period stored by IC 10. The time period for an intermediate voltage level change may be a period less than the timeout threshold for the requested voltage change. In response to an intermediate voltage level change signal, power management unit 102 may change one or more clocks to an intermediate clock frequency. Further, if an intermediate voltage change is not met within a threshold period, system 5 may cause an abort of the voltage change request. In some embodiments, power management unit 102, monitor circuit 100, or another component of IC 10 may abort the voltage change request. System 5, or IC 10, may cause an abort of the request by causing power supply unit 104 to resume generating voltage source 108 at the original voltage or by generating an interrupt.

Voltage monitor circuit 100 may monitor one or more voltages generated by power supply 104. Monitoring one or more voltages may include detecting a start of a voltage change and determining that the requested voltage change is complete. Monitor circuit 100 may track the voltage change until it is stable, i.e., until the change settles at the desired voltage for a certain period of time (e.g., for a voltage change from 1.0 to 1.1 V, the period of time may on the order of 40-50 µs). In one embodiment, monitor circuit 100 provides a signal to power management unit 102 indicating that the requested voltage change is complete. In one embodiment, monitor circuit 100 may provide indications that the voltage source has been changed to intermediate voltage levels between the starting voltage level and the requested voltage level, within respective time periods stored by IC 10. Monitor circuit 100 may also provide a current voltage indication to power management unit 102. For example, a current voltage indication may be provided in response to an aborted voltage change or as an intermediate voltage level indication. A current voltage indication may simply be a voltage level represented by a single bit status signal, e.g., 1.12 V, or multiple bits that represent a voltage level. In some embodiments, a current voltage indication may be provided in addition to the voltage change complete request. Either type of indication may include an IRQ, register flag, state change bit, or some other form of a frequency lock release. In one embodiment, the monitoring is performed by monitoring the frequency of a voltage controlled oscillator (VCO), such as a ring oscillator, located within monitor circuit 100. In other embodiments, monitoring may be performed by delay lines, brute force A/D conversion, or one or more RC circuits.

An integrated circuit 10 that includes a monitor circuit 100 and power management unit 102 may reduce the possibility that a voltage request, lost in communication between power management unit 102 and power supply 104, would perform a frequency change on the (erroneous) assumption that a requested voltage change is complete. Without closed-loop feedback such as provided by the configuration of FIG. 1, system instability may result. In a situation in which a voltage change request does not reach power supply 104, a timeout threshold may be reached, which may cause system 5 to abort the voltage change request and not change a clock frequency. In some embodiments, power management unit 102, monitor circuit 100, or another component of IC 10 may abort the voltage change request. In a situation where a voltage change request reaches power supply 104, power management unit 102 may be configured to update a frequency of the clocks based on receiving an indication from monitor circuit 100. As a result, the likelihood of a resulting unstable IC 10 is greatly reduced.

Figure 2:
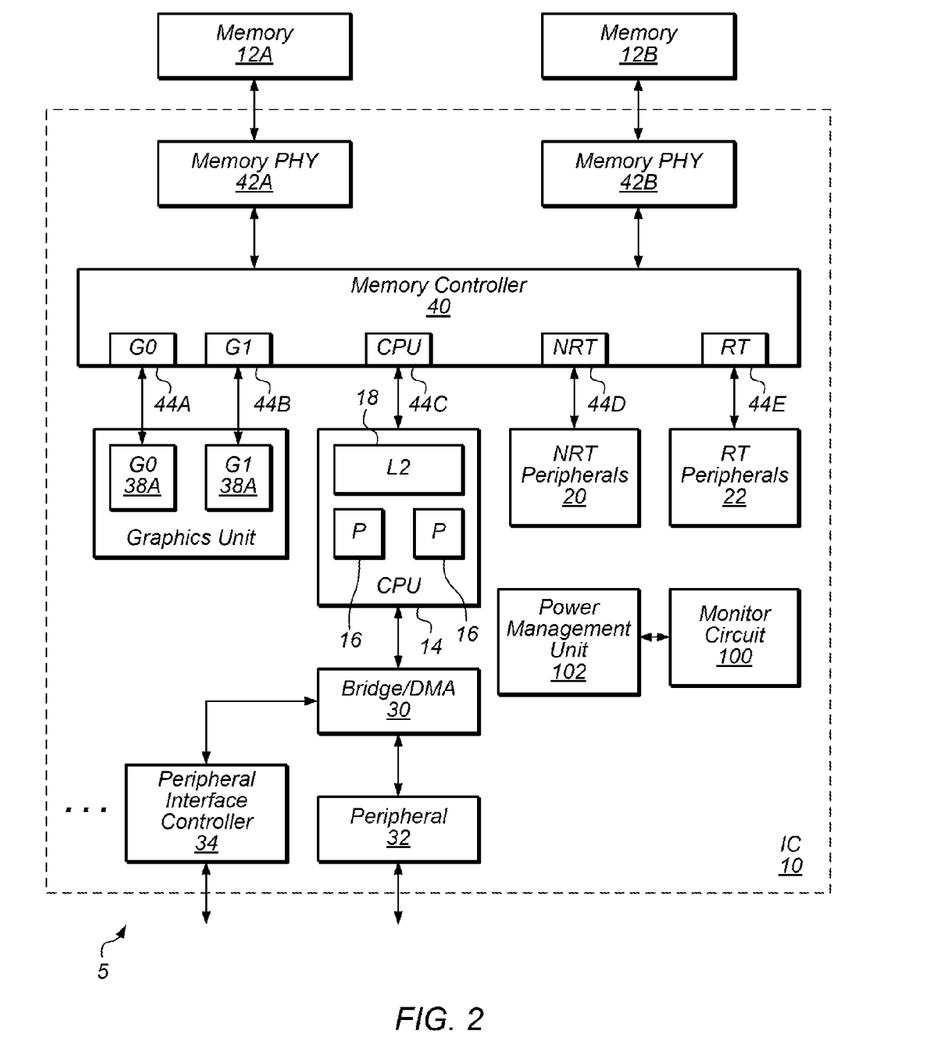
FIG. 2 is a block diagram illustrating one embodiment of an integrated circuit.

Turning now to FIG. 2, a block diagram of one embodiment of a system 5 is shown. In the embodiment of FIG. 2, the system 5 includes an integrated circuit (IC) 10 coupled to external memories 12A-12B. In the illustrated embodiment, the integrated circuit 10 includes a central processor unit (CPU) block 14 which includes one or more processors 16 and a level 2 (L2) cache 18. Other embodiments may not include L2 cache 18 and/or may include additional levels of cache. Additionally, embodiments that include more than two processors 16 and that include only one processor 16 are contemplated. The integrated circuit 10 further includes a set of one or more non-real time (NRT) peripherals 20 and a set of one or more real time (RT) peripherals 22. In the illustrated embodiment, the CPU block 14 is coupled to a bridge/direct memory access (DMA) controller 30, which may be coupled to one or more peripheral devices 32 and/or one or more peripheral interface controllers 34. The number of peripheral devices 32 and peripheral interface controllers 34 may vary from zero to any desired number in various embodiments. The system 5 illustrated in FIG. 2 further includes a graphics unit 36 including one or more graphics controllers such as G0 38A and G1 38B. The number of graphics controllers per graphics unit and the number of graphics units may vary in other embodiments. As illustrated in FIG. 2, the system 5 includes a memory controller 40 coupled to one or more memory physical interface circuits (PHYs) 42A-42B. The memory PHYs 42A-42B are configured to communicate on pins of the integrated circuit 10 to the memories 12A-12B. The memory controller 40 also includes a set of ports 44A-44E. The ports 44A-44B are coupled to the graphics controllers 38A-38B, respectively. The CPU block 14 is coupled to the port 44C. The NRT peripherals 20 and the RT peripherals 22 are coupled to the ports 44D-44E, respectively. The number of ports included in a memory controller 40 may be varied in other embodiments, as may the number of memory controllers. That is, there may be more or fewer ports than those shown in FIG. 2. The number of memory PHYs 42A-42B and corresponding memories 12A-12B may be one or more than two in other embodiments.

Generally, a port may be a communication point on the memory controller 40 to communicate with one or more sources. In some cases, the port may be dedicated to a source (e.g. the ports 44A-44B may be dedicated to the graphics controllers 38A-38B, respectively). In other cases, the port may be shared among multiple sources (e.g. the processors 16 may share the CPU port 44C, the NRT peripherals 20 may share the NRT port 44D, and the RT peripherals 22 may share the RT port 44E. Each port 44A-44E is coupled to an interface to communicate with its respective agent. The interface may be any type of communication medium (e.g. a bus, a point-to-point interconnect, etc.) and may implement any protocol. The interconnect between the memory controller and sources may also include any other desired interconnect such as meshes, network on a chip fabrics, shared buses, point-to-point interconnects, etc.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 caches, and thus the cache 18 is an L2 cache. Other embodiments may include multiple levels of caches in the processors 16, and the cache 18 may be the next level down in the hierarchy. The cache 18 may employ any size and any configuration (set associative, direct mapped, etc.).

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as the peripheral 32 and/or peripherals coupled to a peripheral interface controlled by the peripheral interface controller 34 may also be non-real time peripherals, but may not require independent access to memory. Various embodiments of the NRT peripherals 20 may include video encoders and decoders, scaler circuitry and image compression and/or decompression circuitry, etc.

The RT peripherals 22 may include any peripherals that have real time requirements for memory latency. For example, the RT peripherals may include an image processor and one or more display pipes. The display pipes may include circuitry to fetch one or more frames and to blend the frames to create a display image. The display pipes may further include one or more video pipelines. The result of the display pipes may be a stream of pixels to be displayed on the display screen. The pixel values may be transmitted to a display controller for display on the display screen. The image processor may receive camera data and process the data to an image to be stored in memory.

The bridge/DMA controller 30 may include circuitry to bridge the peripheral(s) 32 and the peripheral interface controller(s) 34 to the memory space. In the illustrated embodiment, the bridge/DMA controller 30 may bridge the memory operations from the peripherals/peripheral interface controllers through the CPU block 14 to the memory controller 40. The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operation on behalf of the peripherals 32 and the peripheral interface controllers 34 to transfer blocks of data to and from memory. More particularly, the DMA controller may be configured to perform transfers to and from the memory 12A-12B through the memory controller 40 on behalf of the peripherals 32 and the peripheral interface controllers 34. The DMA controller may be programmable by the processors 16 to perform the DMA operations. For example, the DMA controller may be programmable via descriptors. The descriptors may be data structures stored in the memory 12A-12B that describe DMA transfers (e.g. source and destination addresses, size, etc.). Alternatively, the DMA controller may be programmable via registers in the DMA controller (not shown).

The peripherals 32 may include any desired input/output devices or other hardware devices that are included on the integrated circuit 10. For example, the peripherals 32 may include networking peripherals such as one or more networking media access controllers (MAC) such as an Ethernet MAC or a WiFi (IEEE 802.11b, g, n) controller. An audio unit including various audio processing devices may be included in the peripherals 32. One or more digital signal processors may be included in the peripherals 32. The peripherals 32 may include any other desired function such as timers, an on-chip secrets memory, an encryption engine, etc., or any combination thereof.

The peripheral interface controllers 34 may include any controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc.

Voltage monitor 100 may monitor one or more voltages 108 in system 5. For example, voltage monitor 100 may monitor a supply voltage 108 from off-chip power supply 104. Voltage monitor 100 is discussed in further detail in FIG. 3.

Not shown in FIG. 2, power management unit 102 may distribute power throughout IC 10 and generate all of the IC's clocks. Power management unit 102 may also transmit voltage change requests 106 and modify clock frequencies. Voltage and frequency changes are discussed in more detail in FIG. 4.

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 2 and/or other components. While one instance of a given component may be shown in FIG. 2, other embodiments may include one or more instances of the given component. Similarly, throughout this detailed description, one or more instances of a given component may be included even if only one is shown, and/or embodiments that include only one instance may be used even if multiple instances are shown.

Figure 3:
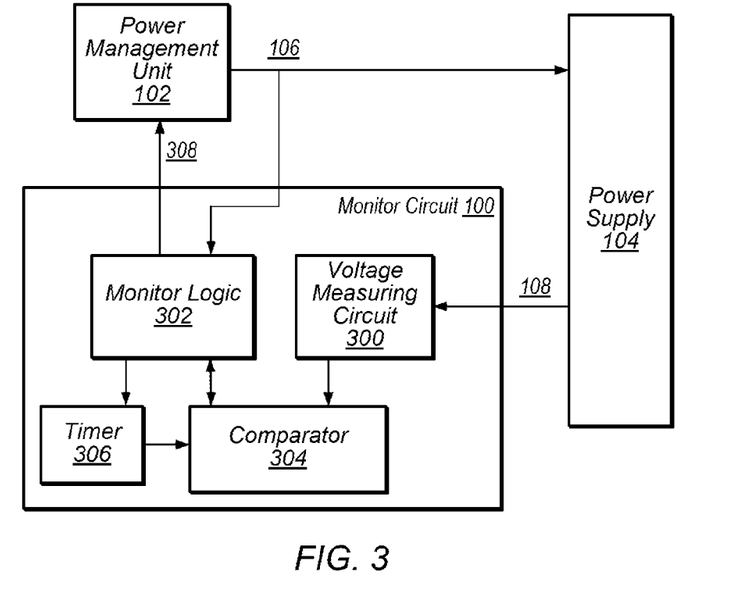
FIG. 3 is a block diagram of one embodiment of one portion of a monitor circuit shown in FIG. 1.

Turning now to FIG. 3, a block diagram of a portion of one embodiment of a monitor circuit 100 is shown. In the illustrated embodiment, monitor circuit 100 includes voltage measuring circuit 300, monitor logic 302, comparator 304, and timer 306. As shown, voltage measuring circuit 300 may monitor one or more voltages 108 from power supply 104 and monitor logic 302, along with comparator 304 and timer 306, may determine the status of a voltage change request and signal an indication 308 of that status to power management unit 102. In one embodiment, monitor circuit 100 may be located in power supply 104.

In one embodiment, voltage measuring circuit 300 includes a VCO, such as a ring oscillator. In other embodiments, voltage measuring circuit 300 may include delay lines, A/D converters, or one or more RC circuits or any other circuit (known in the art) that shows voltage dependent behavior detectable by digital logic. In one embodiment, voltage measuring circuit 300 may provide a voltage measurement to comparator 304.

In one embodiment, monitor logic 302 may command comparator 304 to start monitoring voltage 108. Comparator 304 may watch for the start of a requested voltage change by monitoring the frequency of the VCO or other measuring circuitry in voltage measuring circuit 300. Comparator 304 may then track the voltage change until it settles. At the point where the voltage settles at a desired or requested voltage for a period of time, within a timeout threshold as provided to comparator 304 by timer 306, the voltage is stable and the requested change is complete. Comparator 304 may then indicate to monitor logic 302 that the requested voltage change is complete. In one embodiment, comparator 304 tracks the voltage measurement until a timeout threshold has been reached. If the timeout threshold has been reached, comparator 304 may indicate to monitor logic 302 that the requested voltage change did not complete within the timeout threshold.

Monitor logic 302 may receive a voltage change request indication from power management unit 102. The voltage change request indication may be the same voltage change request from command interface 106 that power management unit 102 transmits to power supply 104 or it may be a separate signal, signals, or value on a shared bus. In one embodiment, the indication from power management unit 102 may allow monitor logic 302 to indicate to comparator 304 to start detecting the requested voltage change. Monitor logic 102 may also direct timer 306 to provide a timeout timer to comparator 304. In one embodiment, monitor logic 302 may receive a voltage change complete indication from comparator 304.

Monitor logic 302 may also provide an indication 308 to power management unit 102 that the voltage change is complete. In some embodiments, monitor logic 302 may generate an interrupt or otherwise signal to power management unit 102 that the voltage change is not complete within the timeout threshold. In one embodiment, monitor logic 302 may signal 308 the completion of an intermediate voltage change within the requested voltage change. For example, if power management unit 102 requests a voltage change from 1.1 V to 1.2 V, monitor logic 302 may provide voltage change signals 308 for intermediate voltages 1.12 V, 1.14 V, 1.16 V, and 1.18 V. Intermediate voltage change signals 308 may or may not indicate that a voltage is stable at the intermediate voltage. In one embodiment, a voltage change completion indication 308 may include a bit for a state machine of the power management unit 102, an IRQ, a transition complete flag for a register of the power management unit 102, or provide some other indication for the power management unit 102 to release a lock on a frequency update. Intermediate voltage change signals provided to power management unit 102 may include any of the preceding indications. In other embodiments, intermediate voltage change signals may provide a current voltage status. Referring to the previous example, when a voltage level reaches 1.16 V, instead of setting a state machine bit of power management unit 102 to transition to a new frequency, monitor logic 302 may simply indicate that the current voltage is 1.16 V.

In contrast to a system that uses timed delays to assume a voltage transition is complete before changing frequencies, monitor circuit 100 may provide a closed-loop control path that may obviate the need to rely on those timed delays or, as in the case of some systems, complex assumptions regarding power supply dependencies. Using a monitor circuit may ensure that a voltage transition is complete before changing a clock frequency, which may result in a more stable system.

Figure 4:
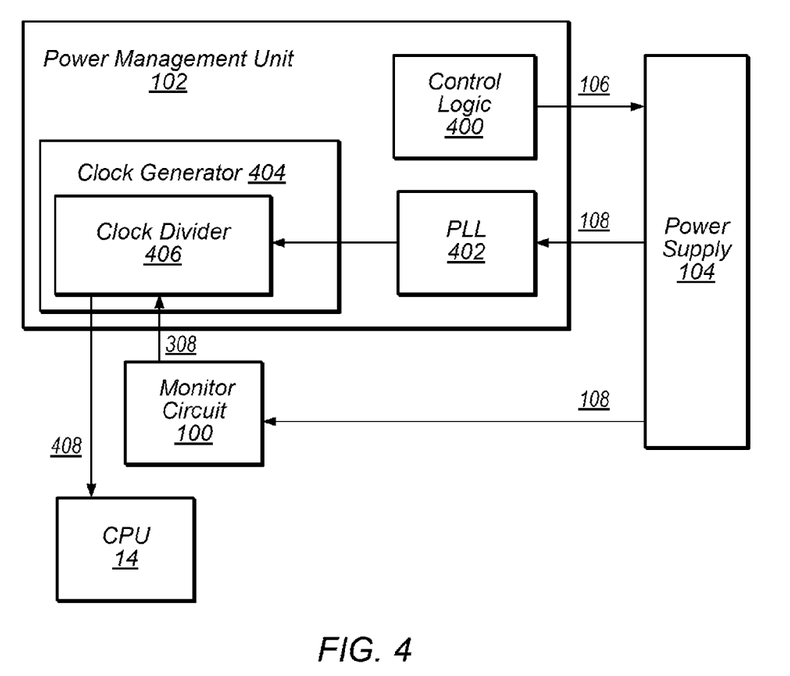
FIG. 4 is a block diagram of one embodiment of one portion of a power management unit shown in FIG. 1.

Turning now to FIG. 4, a block diagram of a portion of one embodiment of a power management unit 102 is shown. In the illustrated embodiment, power management unit 102 may include control logic 400, phase-locked loop frequency synthesizer (PLL) 402, and clock generator 404, which may include clock divider 406. Control logic 400 may transmit a voltage change request to power supply 104. Power supply 104 may provide one or more voltages to PLL 402, which may be the same voltage that monitoring circuit 100 monitors. In the illustrated embodiment, voltage monitor 100 provides indications of the voltage it monitors to clock divider 406.

As shown in FIG. 4, control logic 400 may transmit a voltage change request to off-chip power supply 104. Control logic 400 may also terminate or abort a voltage change request. In one possible termination scenario, control logic 400 may transmit a request to power supply 104 to return to a previous voltage, to stop an in-progress voltage change, to change to a new voltage level, or to generate an interrupt. Upon receiving the voltage change request, power supply 104 may provide the requested voltage to PLL 402. In one embodiment, power management unit 102 may include more than one PLL 402.

PLL 402 may provide clock frequency multiplication (or division) capabilities throughout IC 10. In one embodiment, PLL 402 receives a voltage from power supply 104, the voltage being a certain input frequency. PLL 402 may generate an output clock that is in phase with the input frequency. In one embodiment, changing the voltage of IC 10, and as a result, the input to PLL 402, does not cause PLL 402 to lose lock.

Figure 5:
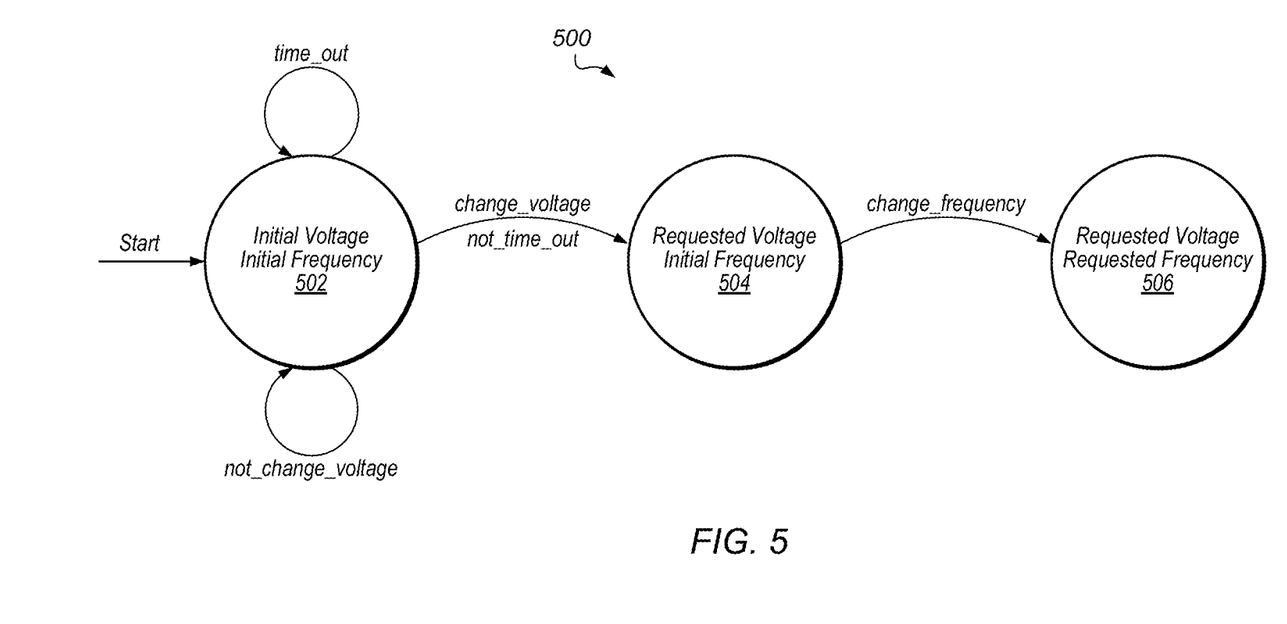
FIG. 5 is a state diagram illustrating one embodiment of a monitoring sequence.

PLL 402 may provide its output clock to one or more clock generator circuits 404. Clock generator 404 may be used to further select and/or divide a clock frequency for various uses through IC 10. In some embodiments, clock generator 404 may be a multiplexer (mux), a divider (clock divider 406), or a mux and clock divider 406. Clock divider 406 may provide one or more clocks of varying frequencies throughout IC 10. In one embodiment, clock divider 406 provides one or more clocks to CPU 14 and processor(s) 16. In one embodiment, clock divider 406 may include a state machine to generate a request to update divisor values. In one embodiment, the state machine may receive an input from monitor circuit 100, an indication that a requested voltage change is complete, to generate the request to update divisor values, and, as a result, an adjusted clock frequency. One embodiment of a state machine used to update divisor values is shown in FIG. 5.

In another embodiment, clock divider 406, or another component of power management unit 102, may include a register. Monitor circuit 100 may provide an indication to set a "transition complete" flag in the register enabling clock divider 406 to update a clock frequency.

In other embodiments, monitor circuit 100 could trigger an IRQ or cause a lock on the frequency update to be released. In one embodiment, power management unit 102 may include waiting for interrupt (WFI) logic to control clock frequency updates. Upon receiving the IRQ from monitor circuit 100, the WFI logic may issue a frequency update signal to CPU 14. Other embodiments include other forms of frequency update locks. In an embodiment utilizing WFI logic or other forms of frequency locks, upon enabling the logic or releasing the lock, clock divider 406 may update a clock frequency, such as a clock frequency for CPU 14 and processors 16.

In one embodiment, clock divider 406 may change a frequency incrementally. In such an embodiment, monitor circuit 100 may signal that intermediate voltage changes, within the requested voltage change, are complete. In response, clock divider 406 may change one or more clocks to an intermediate clock frequency. For example, consider a scenario where power management unit requested a voltage change from 1.1 V to 1.2 V and will update a CPU clock from 502 MHz to 850 MHz. In one embodiment, monitor circuit may provide an indication to clock divider 406 that a voltage has reached 1.12 V, 1.14 V, 1.16 V, and 1.18V. Clock divider 406 may update a CPU clock at 1.12 V to 570 MHz, at 1.14 V to 640 MHz, at 1.16 V to 710 MHz, at 1.18 V to 780 MHz, and finally upon reaching the desired voltage of 1.2 V, to update the CPU clock to 850 MHz. In one embodiment, a table may be implemented where voltage levels and frequency steps may be programmable. The table may include different voltage and frequency pairs depending on whether the voltage is rising or falling. In other embodiments, monitor circuit may provide an indication of a current voltage to clock divider 406, or generally to power management unit 102, but clock divider 406 may not update a frequency until the entire requested voltage change is complete. Using the previous example, monitor circuit 100 may provide updates at every 0.02 V of the requested voltage change but clock divider 406 may make a single frequency change, from 502 MHz to 850 MHz, when monitor circuit 100 provides an indication that the requested voltage change to 1.2 V is complete.

As noted above, certain situations exist where a request from power management unit 102 to power supply 104 is lost in communication. By relying on indications from monitor circuit 100 before updating a frequency of the clocks, the likelihood of operating IC 10 under conditions that result in unstable operation may be greatly reduced.

Turning now to FIG. 5, a state diagram 500 is shown illustrating operation of one embodiment of a voltage monitoring and frequency change sequence. The illustrated state machine includes three states, an initial state 502, a state where the requested voltage change is complete 504, and a state where the requested voltage and frequency changes are complete 506. In one embodiment, the state machine is a component of clock divider 406.

State 502 may be the default state that may be reached following a power-on sequence, or following a previous voltage and frequency change. In the illustrated embodiment, if no current voltage change has been requested, then not_change_voltage will be set and the state will remain in state 502. Likewise, if a requested voltage change has been requested but the state machine has not received an indication that the voltage change is complete within a timeout threshold, then time_out may be set and the state may remain in state 502. If a voltage change completion indication has been received within a timeout threshold period, then change_voltage and not_time_out may be set moving the state to state 504. In some embodiments, change_voltage may be an indication from monitor circuit 100 that the voltage change is complete.

State 504 may be a state that has reached a requested voltage level but remains at an initial frequency. Upon receiving a change_frequency signal, the frequency is updated to the desired frequency and the state changes to state 506. In some embodiments, change_frequency, and not change_voltage, is an indication from monitor circuit 100 that the voltage change is complete. In some embodiments, monitor circuit 100 may provide both the change_voltage and change_frequency signals to the state machine. They may be indicative of the same event or two separate events monitor circuit 100 measures.

State 506 may represent a complete voltage and frequency change. State 506 may then be the initial state 502 for a subsequent voltage and frequency change request.

Other embodiments of state machine 500 may include states for intermediate voltages and may also include states for intermediate frequencies. For aborted voltage changes or where a timeout threshold has been reached when state machine 500 is at an intermediate voltage and/or frequency, the voltage may remain at the intermediate voltage and frequency levels or may return to the pre-change voltage and frequency. Further, state machine 500 is one illustration of how power management unit 102 may receive an indication of a voltage change completion from monitor circuit 100 and adjust a clock frequency. Power management unit 102, in some embodiments, may not use a state machine for this purpose. Embodiments using a state machine may allow the silicon to pace itself in terms of when to adjust a clock frequency.

Figure 6:
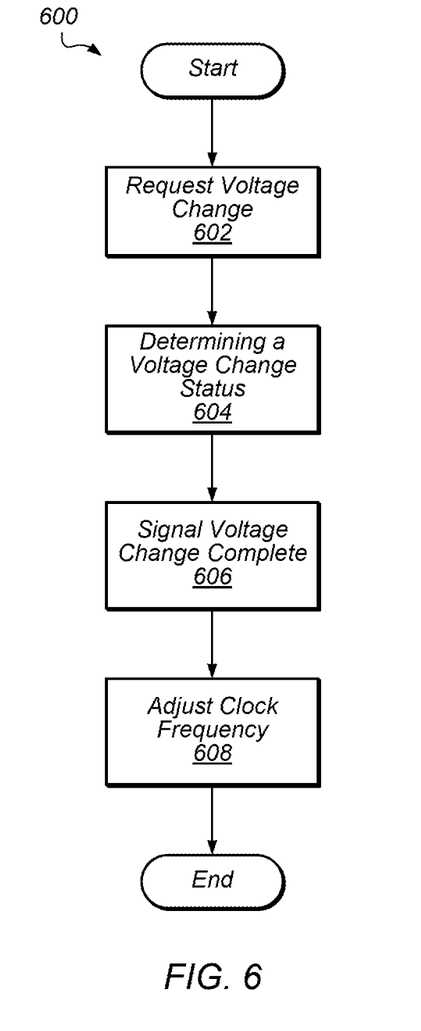
FIG. 6 is a flowchart illustrating operation of one embodiment of a monitoring process.

Turning now to FIG. 6, one embodiment of a voltage monitoring and frequency updating process is shown. In one embodiment, monitor circuit 100 performs the voltage monitoring portion of method 600 and power management unit 102 performs the voltage request and the clock frequency adjusting portion. In some embodiments, method 600 may include additional (or fewer) steps than shown.

In step 602, power management unit 102 may transmit a request for a voltage change to power supply 104. The voltage change may be for all voltages supplied by power supply 104 or for specific voltage supplies. In one embodiment, the voltage change request is for a CPU 14 voltage.

In step 604, monitor circuit 100 may determine a status of the voltage change. Determining a status of the voltage change may include detecting the start of the requested change and determining that the requested voltage change is complete. Monitor circuit 100 may include a VCO, such as a ring oscillator, delay lines, A/D converters, or one or more RC circuits to measure a voltage. In one embodiment, the requested voltage change is complete when the voltage is stable at the new voltage level. In one embodiment, monitor circuit 100 may determine if the requested voltage change has completed within a timeout threshold. In other embodiments, power management unit 102, as part of steps 606 or 608, determines if the voltage change complete indication is received from monitor circuit 100 within a timeout threshold.

In step 606, monitor circuit 100 may signal to power management unit 102 that the requested voltage change is complete. In one embodiment, monitor circuit 100 may provide indications that intermediate voltages, within a voltage change request, have been reached. In some embodiments, the indications may be provided to power management unit 102. In other embodiments, monitor circuit 100 may provide an indication to power management unit 102 that the requested voltage change is complete. In one embodiment, monitor circuit 100 may provide a current voltage level to power management unit 102.

In step 608, power management unit 102 may adjust a clock frequency of one or more clocks upon receiving indication that the requested voltage change is complete or that an intermediate voltage level has been reached. In one embodiment, power management unit 102 adjusts the frequencies of clocks that supply CPU 14.

In one embodiment, method 600 may be controlled by power supply 104. In such an embodiment, IC 10 may provide a target voltage to power supply 104 and power supply 104 may transmit indications of progress of the voltage change. The indications of progress of the voltage change may be received by power management unit 102 and, in response, power management unit 102 may control any changes in frequency.

In certain environments, a power supply, upon receiving a voltage change request, may ramp a voltage up or down at its own discretion. The voltage transition may need to be completed before switching frequencies to ensure a stable chip. At least two situations may arise that could create an unstable chip. First, the situation may exist where a voltage change request is lost in communication. Based on timed delays or complex assumptions of power supply dependencies, the voltage change is assumed complete. Accordingly, the CPU clock frequency is adjusted when, in fact, the voltage never changed. Second, the situation may exist where the power supply 104 ramps the voltage up or down slower than expected, and, as a result, the CPU clock frequency is adjusted before the voltage change is complete. Method 600 may ensure that a voltage transition is complete before switching frequencies and, therefore, reduce the risk of creating an unstable chip environment.

An integrated circuit 10 that includes a monitor circuit 100 and power management unit 102 may reduce the possibility that a voltage request, lost in communication between power management unit 102 and power supply 104, would be assumed complete and cause a frequency change that would render the system unstable. In a situation where a voltage change request does not reach power supply 104, a timeout threshold may be reached, which may cause the power management unit 102 to abort the voltage change request and not change a clock frequency. In a situation where a voltage change request reaches power supply 104, power management unit 102 may rely on indications from monitor circuit 100 before updating a frequency of the clocks. As a result, the likelihood of a resulting unstable IC 10 is greatly reduced.

Exemplary System

Figure 7:
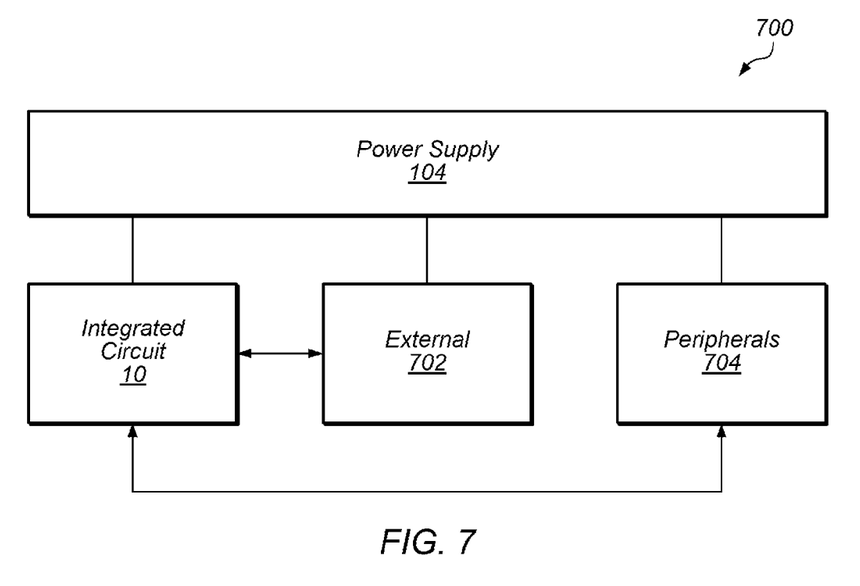
FIG. 7 is a block diagram illustrating one embodiment of an exemplary system.

Turning next to FIG. 7 a block diagram of one embodiment of a system 750 is shown. In the illustrated embodiment, the system 700 includes at least one instance of an integrated circuit 10 coupled to an external memory 702. The external memory 702 may form the main memory subsystem discussed above with regard to FIG. 2 (e.g. the external memory 702 may include the memory 12A-12B). The integrated circuit 10 is coupled to one or more peripherals 704 and the external memory 702. A power supply 104 is also provided which supplies the supply voltages to the integrated circuit 10 as well as one or more supply voltages to the memory 702 and/or the peripherals 704. In some embodiments, more than one instance of the integrated circuit 10 may be included (and more than one external memory 702 may be included as well).

The memory 702 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 10 in a chip-on-chip configuration, a package-on-package configuration, or a multi-chip module configuration.

The peripherals 704 may include any desired circuitry, depending on the type of system 700. For example, in one embodiment, the system 700 may be a mobile device (e.g. personal digital assistant (PDA), smart phone, etc.) and the peripherals 704 may include devices for various types of wireless communication, such as wifi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g. desktop personal computer, laptop, workstation, net top etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a power management unit configured to transmit a request to change a voltage supplied within the apparatus to a new voltage level; and
   a monitor circuit configured to generate a determination of whether the requested voltage change is complete, wherein the determination includes an analysis of whether a level of the voltage source has been changed to an intermediate level within a predetermined time interval, wherein the predetermined time interval is stored by the apparatus, and wherein the intermediate level is below the new voltage level;
   wherein the apparatus is configured to cause a clock frequency of the apparatus to be changed in response to a determination by the monitor circuit that the level of the voltage source is stable at the new voltage level for at least a predetermined period of time.

2. The apparatus of claim 1, further comprising a power supply unit, wherein the power management unit is configured to transmit the request to the power supply unit, and wherein, responsive to the request, the power supply unit is configured to supply the new voltage level to the apparatus.

3. The apparatus of claim 1, wherein the monitor circuit is configured to determine that the requested voltage change is complete based at least in part on a detection of a start of the requested voltage change.

4. The apparatus of claim 1, further comprising a clock generator configured to change the clock frequency.

5. The apparatus of claim 4, wherein the apparatus includes a processor configured to issue a voltage change command for execution, wherein the power management unit is configured to transmit the request in response to the voltage change command.

6. The apparatus of claim 1, wherein the power management unit and the monitor circuit are included on a single integrated circuit.

7. A method, comprising:
   a monitor circuit detecting a request to change a voltage source of a processor to a new voltage level;
   the monitor circuit monitoring the request to generate a determination of whether the requested voltage change is complete, wherein the determination includes an analysis of whether a level of the voltage source has been changed to an intermediate level within a predetermined time interval, and wherein the intermediate level is below the new voltage level; and
   the processor requesting a clock frequency to be changed in response to the monitor circuit determining that the level of the voltage source is stable at the intermediate voltage level for at least a predetermined period of time.

8. The method of claim 7, wherein monitoring the request includes monitoring a frequency of a voltage-controlled oscillator of the monitor circuit that is configured to receive the voltage source, and wherein monitoring the request includes detecting a start of the requested voltage change.

9. The method of claim 7, wherein the processor is located on an integrated circuit, wherein the monitor circuit is also located on the integrated circuit, and wherein the voltage source is produced by a power supply not located on the integrated circuit.

10. The method of claim 8, wherein the processor is located on an integrated circuit, wherein the voltage source is produced by a power supply not located on the integrated circuit, and wherein the monitor circuit is located in the power supply.

11. The method of claim 7, further comprising aborting the request in response to determining that the requested voltage change has not been completed within a specified time.

12. A method, comprising:
   a processor requesting a change in a voltage source supplied to the processor, wherein the change is from a current voltage level to a new voltage level;
   the processor determining that the voltage source has been changed to a first intermediate level within a first predetermined time period stored by the processor, wherein the first intermediate level is between the current voltage level and the new voltage level; and
   the processor determining that the voltage source has been changed to a second intermediate level within a second predetermined time period stored by the processor, wherein the second intermediate level is between the first intermediate level and the new voltage level.

13. The method of claim 12, further comprising:
   the processor successively determining that the voltage source has been changed to one or more other intermediate levels between the second intermediate levels and the new voltage level within respective predetermined time periods stored by the processor; and
   the processor determining that the voltage source has been changed from one of the one or more other intermediate levels to the new voltage level with a third predetermined time period stored by the processor.

14. The method of claim 13, further comprising:
   the processor requesting a clock frequency change for the processor in response to the processor determining that each intermediate voltage change between the current voltage level and new voltage level occurred within corresponding predetermined time periods stored by the processor.

15. The method of claim 12, wherein a change to the first intermediate level is requested by a power management unit of the processor, and wherein determining that the voltage source has been changed to the first intermediate level within the first predetermined time period is performed by a monitor circuit of the processor, and wherein the method further comprises the monitor circuit signaling to the power management unit that the voltage source has been changed to the first intermediate level within the first predetermined time period.

16. An apparatus, comprising:
a processing core configured to transmit to a power supply unit a request to change a level of a voltage source supplied to the processing core, wherein the change is from a current voltage level to a new voltage level; and
a voltage change monitor circuit configured to determine whether the level of the voltage source has been changed to an intermediate level within a predetermined time interval, wherein the predetermined time interval is stored by the apparatus, and wherein the intermediate level is between the current voltage level and the new voltage level;
wherein the apparatus is configured to cause a clock frequency of the processing core to be changed in response to a determination by the voltage change monitor circuit that the level of the voltage source is stable at the intermediate level for at least a predetermined period of time.

17. The apparatus of claim 16, wherein, in response to a determination by the voltage change monitor circuit that the request has not been satisfied within a threshold time period, the apparatus is configured to generate an interrupt.

18. The apparatus of claim 16, further comprising:
a power management unit configured to transmit the request to the power supply unit;
wherein the power supply unit is configured to change the voltage source from the current voltage level to the intermediate voltage level in response to receiving the request, and wherein the apparatus is configured to abort the request by causing the power supply unit to resume generating the voltage source at the current voltage level.

19. A system, comprising:
a power supply unit configured to supply a voltage to the system;
a power management unit configured to transmit a request for a modification to modify a voltage supply level from the power supply unit to the system, wherein the request to modify includes a request to change a current voltage supply level to a higher voltage supply level; and
a monitor circuit configured to monitor the voltage supply level to generate a determination whether the voltage supply level modification is complete, wherein the determination includes a first analysis of whether the voltage supply level has been changed to a first intermediate level within a first predetermined time threshold, wherein the first intermediate level is between the current voltage supply level and the higher voltage supply level, and wherein the determination further includes a second analysis of whether the voltage supply level has been changed to a second intermediate level within a second predetermined time threshold, wherein the second intermediate level is between the current voltage supply level and the higher voltage supply level.

20. The system of claim 19, wherein, in response to an indication by the monitor circuit that the voltage supply level modification is complete, the power management unit is configured to change a frequency of a clock.

21. The system of claim 19, wherein the power management unit is configured to change a clock frequency of the system after a determination that the voltage supply level modification is complete.

22. The system of claim 19, wherein, in response to a determination by the monitor circuit that the request to modify has not been satisfied within a time period, the monitor circuit is configured to cause the request to be terminated.

23. The system of claim 19, wherein, in response to a determination by the monitor circuit that the request to modify has not been satisfied within a time period, the monitor circuit is configured to generate an interrupt.

24. The system of claim 19, wherein the power management unit and the monitor circuit are included on a single integrated circuit.

* * * * *